(12) United States Patent
Carnahan et al.

(10) Patent No.: US 7,491,672 B2
(45) Date of Patent: Feb. 17, 2009

(54) CHEMICALLY-MODIFIED SUPPORTS AND SUPPORTED CATALYST SYSTEMS PREPARED THEREFROM

(75) Inventors: Edmund M. Carnahan, Fresno, TX (US); David R. Neithamer, Midland, MI (US)

(73) Assignee: Ineos Europe Limited, Hampshire (GB)

( * ) Notice: Subject to any disclaimer, the term of this patent is extended or adjusted under 35 U.S.C. 154(b) by 103 days.

(21) Appl. No.: 11/526,242

(22) Filed: Sep. 25, 2006

(65) Prior Publication Data

US 2007/0105709 A1     May 10, 2007

Related U.S. Application Data

(63) Continuation of application No. 10/169,719, filed as application No. PCT/US01/00625 on Jan. 9, 2001, now abandoned.

(60) Provisional application No. 60/175,614, filed on Jan. 11, 2000.

(51) Int. Cl.
    *B01J 21/00*    (2006.01)
(52) U.S. Cl. .................................. 502/232; 502/439
(58) Field of Classification Search ............. 502/151, 502/152, 156, 200, 214, 216, 232, 174, 178, 502/179, 439
See application file for complete search history.

(56) References Cited

U.S. PATENT DOCUMENTS 5,427,991 A    6/1995    Turner
5,721,016 A    2/1998    Panster et al.

FOREIGN PATENT DOCUMENTS

WO      WO 9719959 A1 *   6/1997

* cited by examiner

*Primary Examiner*—Edward M Johnson
(74) *Attorney, Agent, or Firm*—Nixon & Vanderhye

(57) ABSTRACT

The present invention provides a chemically-modified support comprising an inorganic oxide containing optionally functionalized hydroxyl groups, having chemically linked thereto the cation of a cation/anion pair. The present invention further provides a supported catalyst system comprising the chemically-modified support as described above, and a transition metal compound of Groups 3-10 (preferably a Group 4 metal compound) containing at least one π-bonded anionic ligand group, said transition metal compound being capable of reacting with the chemically-modified support through the cation of the cation/anion pair to thereby render the transition metal compound catalytically active. The present invention further provides a process for preparing the chemically-modified support of the invention. The present invention further provides an addition polymerization process comprising contacting one or more addition polymerizable monomers with the supported catalyst system of the invention under addition polymerization conditions.

14 Claims, No Drawings

CHEMICALLY-MODIFIED SUPPORTS AND SUPPORTED CATALYST SYSTEMS PREPARED THEREFROM

RELATED APPLICATIONS

This application is a continuation of application Ser. No. 10/169,719, filed Oct. 3, 2002, now abandoned which is a §371 of International application No. PCT/US01/00625 filed Jan. 9, 2001, which claims the benefit of U.S. Provisional Application No. 60/175,614 filed Jan. 11, 2000.

This invention relates to chemically-modified supports and supported catalysts formed therefrom that are useful for polymerization of olefins. More particularly, the invention relates to such supports comprising an activator compound that is chemically bound or tethered to the support. The invention also relates to the preparation of such chemically-modified support materials and supported catalysts and to their use in an olefin polymerization process.

Several supported cation forming catalysts for use in olefin polymerization processes have been previously disclosed in the art. WO-91/09882 describes a supported catalyst prepared by combining i) a bis(cyclopentadienyl) metal compound containing at least one ligand capable of reacting with a proton, ii) an activator component comprising a cation capable of donating a proton and a bulky, labile anion capable of stabilizing the metal cation formed as a result of reaction between the metal compound and the activator component, and iii) a catalyst support material. The support material can be subjected to a thermal or chemical dehydration treatment. In some of the examples, triethylaluminum is added for this purpose. The maximum bulk density of polymers formed by use of the foregoing supported catalyst reported in WO 91/09882 is 0.17 g/cm$^3$. The reported catalyst efficiencies are less than satisfactory for commercial applications.

WO-94/03506 describes a supported ionic catalyst prepared by combining i) a monocyclopentadienyl metal compound, ii) an activator component comprising a cation which will irreversibly react with at least one ligand contained in said metal compound and an anion, said anion being a chemically stable, non-nucleophilic, anionic complex, and iii) a catalyst support material. Optionally, the supported ionic catalyst can be prepolymerized with an olefinic monomer. The support material can also be treated with a hydrolyzable organoadditive, preferably a Group 13 alkyl compound such as triethylaluminum. The reference also teaches the use of such supported ionic catalysts in a gas phase polymerization process. Disadvantageously, the catalyst efficiencies obtained in WO-94/03506, are likewise insufficient for commercial use.

U.S. Pat. No. 5,399,636 discloses supported metallocene catalysts wherein the metallocene is chemically attached to support materials, including silica, alumina, clay, phosphated alumina, and mixtures thereof, are disclosed. In U.S. Pat. No. 5,427,991, certain catalyst supports comprising polyanionic moieties constituted of noncoordinating anionic groups chemically bonded to crosslinked polymeric core components are disclosed.

Numerous patents and patent applications disclose cationic homogeneous catalysts prepared by the use of cation forming activator compounds. EP-A-277,004 and U.S. Pat. No. 5,064,802 disclose the use of Bronsted acid salts able to form cations via hydrogen transfer. EP A-277,003 discloses a similar process using bulky anions containing multiple boron atoms. WO 93/23412 discloses carbonium salt cation forming activators. U.S. Pat. No. 5,321,106 discloses the use of oxidizing salt cationic. Disadvantageously, such homogeneous catalysts when supported by normal techniques of physical absorption on the surface of a support material, may be removed again by diluents found in common solution or slurry polymerizations. Moreover preparation methods employing impregnation or adsorption from solution can result in a poor dispersion of catalysts on the support, reducing catalyst efficiency.

WO 98/55518 discloses a method of preparing a cationic activator bound to polystyrene.

U.S. Pat. No. 5,807,938 discloses catalysts obtainable by contacting a Group 4 transition metal compound, an organometallic compound, and solid catalyst component comprising a carrier and an ionized ionic compound capable of activating the Group 4 transition metal compound, wherein the ionized ionic compound has a cationic component fixed to the surface of the carrier, and an anionic component. The reported process for preparing the catalyst system will generate inorganic salts which may be difficult to remove. Furthermore, the reported process requires multiple steps on the support which can often result in unintended and undesired byproduct formation.

It would be desirable to provide a supported catalyst and a polymerization process using the same that is capable of producing olefin polymers at good catalyst efficiencies. It would further be desirable to provide such a supported catalyst that is adapted for use in a slurry or gas phase polymerization process and is relatively unaffected by the presence of condensed monomer or diluents. It would furthermore be desirable to provide supported catalysts, which provide for a more uniform distribution of catalyst sites on the support.

These and other objects are accomplished by the present invention. Specifically, the present invention provides a chemically-modified support comprising an inorganic oxide containing optionally functionalized hydroxyl groups, having chemically linked thereto the cation of a cation/anion pair.

The subject invention further provides a chemically-modified support comprising the reaction product of:

(A) an inorganic oxide material containing optionally functionalized hydroxyl groups, and (B) a cation/anion pair comprising:

b$_1$) a cation which is capable of reacting with a transition metal compound in conjunction with other components to form a catalytically active transition metal complex, and containing at least one reactive moiety able to react with the optionally functionalized hydroxyl of the inorganic oxide material, thereby chemically bonding the cation to the surface of the support;

b$_2$) a compatible non-coordinating anion.

The subject invention further provides a chemically-modified support comprising the reaction product an inorganic oxide material containing optionally functionalized hydroxyl groups and a cation/anion pair, wherein the cation corresponds to the formula:

wherein A=N, P, O, S, C, or Si,

R$^\#$=hydrogen, alkyl, aryl, alkoxide, halide or similar substituent which may be the same or different or in which two groups are linked to form a ring and containing from 1 to 20 carbon atoms, n is 3 when A=is N or P and at least one is R$^\#$=H n is 2 when A=O, S, C or Si, and, when A is O or S, at least one R$^\#$=H; and D=hydroxyalkyl, hydroxyaryl, thioalkyl, thioaryl, hydrosilylalkyl, mono-, di-, or tris-alkoxysilyl, -alkoxysilylalkyl, and -alkoxysilylaryl, said hydrocarbyl radicals having from 4 to 20 nonhydrogen atoms, wherein a chemical bond is formed between the optionally functionalized hydroxyl group of the inorganic oxide material and Group D of the cation.

The present invention further provides a supported catalyst system comprising the chemically-modified support as described above, and a transition metal compound of Groups 3-10 (preferably a Group 4 metal compound) containing at least one π-bonded anionic ligand group, said transition metal compound being capable of reacting with the chemically-modified support through the cation of the cation/anion pair to thereby render the transition metal compound catalytically active.

The present invention further provides an addition polymerization process comprising contacting one or more addition polymerizable monomers with the supported catalyst system of the invention under addition polymerization conditions.

The subject invention further provides a process for preparing a chemically-modified support comprising combining an inorganic oxide material containing optionally functionalized hydroxyl groups with a cation/anion pair, wherein the cation corresponds to the formula:

wherein A=N, P, O, S, C, or Si, $R^\#$=hydrogen, alkyl, aryl, alkoxide, halide or similar substituent which may be the same or different or in which two groups are linked to form a ring and containing from 1 to 20 carbon atoms, n is 3 when A=is N or P and at least one is $R^\#$=H n is 2 when A=O, S, C or Si, and, when A is O or S, at least one $R^\#$=H; and D=hydroxyalkyl, hydroxyaryl, thioalkyl, thioaryl, hydrosilylalkyl, mono-, di-, or tris-alkoxysilyl, -alkoxysilylalkyl, and -alkoxysilylaryl, said hydrocarbyl radicals having from 4 to 20 nonhydrogen atoms, wherein a chemical bond is formed between the optionally functionalized hydroxyl group of the inorganic oxide material and Group D of the cation.

In one preferred embodiment, the process for preparing the chemically-modified support will be such that the hydroxyl groups are non-functionalized prior to contacting with the cation/anion pair, and wherein the cation contains a ligand having an $SiX^p_3$ group capable of reacting with a hydroxyl group, with each $X^p$ independently selected from alkyl, aryl, hydride, halide, or alkyoxide radicals, with the proviso that at least one $X^p$ is a hydride, halide, or alkoxide radical.

In another preferred embodiment, the process for preparing the chemically-modified support will be such that the hydroxyl groups are functionalized with a functionalizing agent prior to contacting with the cation/anion pair, the cation contains a reactive hydroxyl, thiol, or amine group, and the functionalizing agent in turn comprises a silane containing a ligand capable of reacting with the hydroxyl, thiol, or amine group of the cation to form a chemical bond.

In yet another preferred embodiment, the process for preparing the chemically-modified support will be such that the hydroxyl groups are functionalized with a functionalizing agent prior to contacting with the cation/anion pair, the cation contains a reactive hydroxyl, thiol, or amine group, and the functionalizing agent in turn comprises a compound corresponding to the formula $R^p_3Al$ or an alumoxane, with $R^p$ being a $C_1$-$C_{20}$ alkyl radical.

These and other embodiments are more fully set forth in the following detailed description.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

The chemically-modified supports and supported catalysts of the invention are readily prepared in high yields and efficiencies. Importantly, catalyst systems prepared from the chemically-modified supports of the invention demonstrate improved performance as measured by catalyst activity and/or product bulk density, compared to previously known supported catalyst systems.

Surprisingly, it has been found that using the unique combination of activator compounds and inorganic oxide materials as specified herein, the activator compound can be attached to the inorganic oxide material, yet remain capable of activating transition metal catalysts typically employed in addition polymerization processes. Although not wishing to be bound by theory, it is believed that the supported catalysts of the present invention exhibit greater catalytic activity as a result of more uniform distribution of catalyst sites on the support obtained as a result of the chemical binding of the catalyst activator to the inorganic oxide material. The present supported catalysts can be employed to produce olefin polymers at extremely high catalyst efficiencies. Preferably the catalysts attain efficiencies of at least $1\times10^5$ g polymer/g transition metal, more preferably at least $1\times10^6$ g polymer/g transition metal.

Additional benefits of the supported catalysts of the invention include the fact that the invention minimizes (and preferably avoids) the formation of polymer deposits at the reactor walls and other moving parts in the reactor, and that the invention, when applied to particle forming polymerization processes, yields polymers having improved bulk density. According to the present invention, improved bulk densities for ethylene containing homopolymers and interpolymers are bulk densities of at least 0.20 g/cm³, and preferably of at least 0.25 g/cm³.

Suitable inorganic oxide materials for use in the present invention include silicas, aluminas, aluminosilicates, aluminophosphates, clays, titanias, and mixtures thereof. Preferred inorganic oxides are alumina and silica. The most preferred support material is silica. The support material may be in granular, agglomerated, pelletized, or any other physical form.

Inorganic oxide materials suitable for the present invention preferably have a surface area as determined by nitrogen porosimetry using the B.E.T. method from 10 to 1000 m²/g, and preferably from 100 to 600 m²/g. The pore volume of the inorganic oxide material, as determined by nitrogen adsorption, advantageously is between 0.1 and 3 cm³/g, preferably from 0.2 to 2 cm³/g. The average particle size depends upon the application, and is typically from 0.5 to 500 μm, preferably from 1 to 150 μm.

Inorganic oxide materials, especially silica, alumina and aluminosilicates are known to inherently possess small quantities of water. In the practice of the claimed invention, the inorganic oxide material is optionally, and preferably, first subjected to a heat treatment to render the inorganic oxide material substantially free of adsorbed water. Typical heat treatments (calcining) are carried out at a temperature from 150 to 900° C., preferably 200 to 850° C., for 10 minutes to 50 hours.

Upon calcination, residual hydroxyl groups will remain pendant from the atomic matrix. In one embodiment of the claimed invention, at least a portion of the residual hydroxyl groups will be functionalized by means of a functionalizing agent, such as to yield a level of non-functionalized hydroxyl groups of from 0.0001 to 10, preferably less than 1.0, more preferably less than 0.5 and most preferably less than 0.1 mmol/g functionalized inorganic oxide material. Residual hydroxyl functionality can be detected by the technique of Fourier Transform Infrared Spectroscopy (DRIFTS IR) as disclosed in Fourier Transform Infrared Spectroscopy, P. Griffiths & J. de Haseth, 83 *Chemical Analysis*, Wiley Interscience (1986), p. 544.

Functionalizing agents employed in the practice of the claimed invention will have one ligand capable of reacting with a surface hydroxyl and one ligand capable of reacting with a reactive component of the cation. Exemplary functionalizing agents employed in the chemical treatment include organometallic compounds and organosilanes, with the organometallic compounds typically containing at least two metal $C_1$-$C_{20}$ hydrocarbyl groups which preferably are $C_1$-$C_{20}$ alkyl moieties. In the case of organometallic compounds, preferred functionalizing agents include metal hydrocarbyls in which the metal is selected from Groups 2 and 13 to 16 of the Periodic Table of Elements (preferably aluminum or magnesium), with trialkyl aluminum compounds, such as triethylaluminum, diethyl aluminum halides, and triisobutyl aluminum being especially preferred.

In another embodiment, the functionalizing agent will comprise an organosilane. Preferred organosilane functionalizing agents include moieties bearing silane, siloxane, hydrocarbyloxysilane, or halosilane functionality, with such functionalizing agents containing from 1 to $1 \times 10^6$ nonhydrogen atoms, more preferably from 2 to 1000 nonhydrogen atoms, and most preferably 4 to 20 nonhydrogen atoms.

Particularly preferred organosilanes include $SiX_3H$, wherein each X is independently a $C_1$-$C_{20}$ alkyl, $C_6$-$C_{20}$ aryl, hydride, halide, or $C_1$-$C_{20}$ alkyoxide radicals, with the proviso that at least one X is a hydride, halide, or alkoxide radical. Exemplary organosilanes include phenylsilane, dimethylsilane, diphenylsilane, phenylchlorosilane, methyldichlorosilane, and dimethylchlorosilane. Optionally, and preferably, when an organosilane functionalizing agent is employed, it will be introduced in conjunction with a Lewis base assisting agent, such as a tri($C_{1-4}$ alkyl)amine, to promote reaction between the organosilane and the hydroxyl and/or to passivate any hydroxyls which have failed to react with the organosilane. The molar ratio of Lewis base assisting agent employed to organosilane functionalizing agent is generally from 0.7:1 to 2.0:1.

In a preferred embodiment the functionalizing agent (and optional Lewis base assisting agent) and the inorganic oxide are contacted, in the presence of a hydrocarbon diluent. The reaction is conducted at a temperature from 0 to 110° C., preferably from 20 to 50° C. Generally a stoichiometric excess of functionalizing agent is employed. Preferred ratios of functionalizing agent to inorganic oxide material are from 1 to 2500 mmol/g. As a result of the foregoing functionalizing reaction, residual hydroxyl functionality of the inorganic oxide is reduced to the previously mentioned low level of less than 1.0 mmol/g. Preferably, the residual hydroxyl content of functionalized supports is less than 0.5 mmol/g, and most preferably less than 0.1 mmol/g functionalized support material. In the most preferred embodiments, a calcined silica is employed having initial (that is, prefunctionalized) residual hydroxyl content between 0.5 and 2.0 mmol/g, and from 1 to 20 mmol of functionalizing agent/g silica is employed. Unreacted functionalizing agent is preferably removed from the surface of the inorganic oxide, for example, by washing with a liquid hydrocarbon. Preferably, the support is thoroughly dried prior to use in preparing supported catalyst systems.

Suitable anions for use in the present invention comprise any compatible, noncoordinating anion. As used herein, the term "noncoordinating" means an anion or substance which either does not coordinate to the transition metal component and the catalytic derivative derived therefrom, or which is only weakly coordinated to such complexes thereby remaining sufficiently labile to be displaced by a Lewis bases such as olefin monomer. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex. Such anions have been extensively described in the art, such as in U.S. Pat. No. 5,919,983. The functionalization of cations to react with the support does not affect the ability of anions established by the art to form effective activators from acting as such in this invention.

In one preferred embodiment, the anion will contain a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitrites. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

In this regard, one preferred anion will correspond to the formula:

$[M^*Q_4]^-$;

wherein:

$M^*$ is boron or aluminum in the +3 formal oxidation state; and

Q independently at each occurrence is selected from hydride, dialkylamido, halide, hydrocarbyl, halohydrocarbyl, halocarbyl, hydrocarbyloxide, hydrocarbyloxy substituted-hydrocarbyl, organometal substituted-hydrocarbyl, organometalloid substituted-hydrocarbyl, halohydrocarbyloxy, halohydrocarbyloxy substituted hydrocarbyl, halocarbyl-substituted hydrocarbyl, and halo-substituted silylhydrocarbyl radicals (including perhalogenated hydrocarbyl-, perhalogenated hydrocarbyloxy-, and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl. Even more preferably, Q is each occurrence a fluorinated aryl group, especially, a pentafluorophenyl group. In a most preferred embodiment, $M^*$ is boron and Q is in each occurrence a pentafluorophenyl group.

Illustrative, but not limiting, examples of boron compounds which may be used as anions in the practice of this invention are tetraphenyl borate, (pentafluorophenyl)triphenyl borate, tetrakis(pentafluorophenyl)borate, tetrakis(2,3,4,6-tetrafluorophenyl)borate, tris(pentafluorophenyl)(4-hydroxyphenyl)borate, tris(pentafluorophenyl)(tetrafluorophenyl)borate, tris-(2,4-difluorophenyl)(phenyl)borate, tris-(3,5-difluorophenyl)phenyl borate, tris-(3,5-ditrifluoromethylphenyl)phenyl borate, tris(pentafluorophenyl)ethyl borate, tris(pentafluorophenyl)butyl borate, tris(pentafluorophenyl)cyclohexyl borate, tris(pentafluorophenyl)(3,5-dimethyl-phenyl)borate, tris(pentafluorophenyl)4-(phenyl)phenyl borate, and tris(pentafluorophenyl)naphthyl borate.

In an alternate preferred embodiment, the anion will be a compound corresponding to the formula:

$(EJ_j)^{-c}{}_d,$ wherein:

E is an anion group of from 1 to 30 atoms, not counting hydrogen atoms, further containing two or more Lewis base sites;

J independently each occurrence is a Lewis acid coordinated to at least one Lewis base site of E, and optionally two of more such J groups may be joined together in a moiety having multiple Lewis acidic functionality, j is a number from 2 to 12 and c and d are integers from 1 to 3, with the proviso that the charge associated with the anion is balanced by the charge associated with the cation(s) to give a neutral ionic compound. Such compounds are disclosed and claimed in U.S. Ser. No. 09/251,664, filed Feb. 17, 1999 (PCT Publication WO 99/42467).

Examples of most highly preferred anions of this class are substituted imidizolide anions having the following structures:

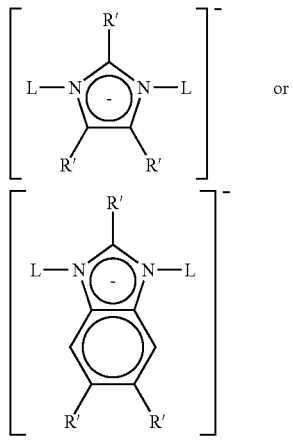

wherein:

R' is in each occurrence is independently selected from hydrogen, hydrocarbyl, silyl, germyl, cyano, halo and combinations thereof, each said R' having up to 30 non-hydrogen atoms (especially methyl or a $C_{10}$ or higher hydrocarbyl group), and L is a trisfluoroarylboron or trisfluoroarylaluminum compound containing three $C_{6-20}$ fluoroaryl-groups, especially pentafluorophenyl groups.

In the practice of the claimed invention, the non-coordinating anion will be stabilized by a reactive cation, prior to contacting with the Groups 3-10 transition metal complex. In particular, the reactive cation will be capable of activating the transition metal complex and will additionally contain a ligand having a reactive group capable of reacting with the optionally functionalized surface hydroxyl group, thereby chemically bonding (preferably covalently bonding) the cation to the inorganic oxide material. The reactive cation is preferably selected from Bronsted acidic cations (especially ammonium and phosphonium cations or oxonium and sulfonium cations), carbonium cations, and silylium cations. The reactive cations and the anions are used in such ratios as to give a neutral ionic compound.

Suitable cations will correspond to the formula:

$(R^{\#}{}_n AD)^+$ wherein A=N, P, O, S, C, or Si, $R^{\#}$=hydrogen, alkyl, aryl, alkoxide, halide or similar substituent which may be the same or different or in which two groups are linked to form a ring and containing from 1 to 20 carbon atoms, n is 3 when A=is N or P and at least one is $R^{\#}$=H n is 2 when A=O, S, C or Si, and, when A is O or S, at least one R#=H; and D=hydroxyalkyl, hydroxyaryl, thioalkyl, thioaryl, hydrosilylalkyl, mono-, di-, or tris-alkoxysilyl, -alkoxysilylalkyl, and -alkoxysilylaryl, said hydrocarbyl radicals having from 4 to 20 nonhydrogen atoms.

Illustrative, but not limiting, preferred examples of functionalized cations useful in the practice of the present invention include:

$[Me_2NH(C_6H_4OH)]^+$ $[HNMe(C_{18}H_{37})(C_6H_4OH)]^+$ $[HNMe(C_{11}H_{23})(C_6H_4OH)]^+$ $[(C_6H_5)_2PH(C_6H_4OH)]^+$ $[(C_6H_5)_2C(C_6H_4OH)]^+$ $[(C_6H_5)OH(C_6H_4OH)]^+$ $[(C_6H_5)SH(C_6H_4OH)]^+$ $[Et_2SiCH_2CH_2OH]^+$ $[Me_2NH(C_6H_4SH)]^+$ $[(C_6H_5)_2PH(C_6H_4SH)]^+$ $[(C_6H_5)_2C(C_6H_4SH)]^+$ $[(C_6H_5)OH(C_6H_4SH)]^+$ $[(C_6H_5)SH(C_6H_4SH)]^+$ $[Me_2NH(C_6H_4SiH_3)]^+$ $[(C_6H_5)_2PH(C_6H_4SiH_3)]^+$ $[(C_6H_5)_2C(C_6H_4SiH_3)]^+$ $[(C_6H_5)OH(C_6H_4SiH_3)]^+$ $[(C_6H_5)SH(C_6H_4SiH_3)]^+$ $[Me_2NH(C_6H_4Si(OMe)_3)]^+$ $[(C_6H_5)_2PH(C_6H_4Si(OMe)_3)]^+$

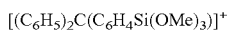

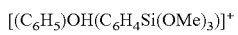

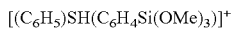

Ionic compounds comprising the functionalized cation can be prepared by subjecting an ionic compound comprising the functionalized cation with the selected anion to a cation exchange reaction with a salt of the functionalized cation.

Generally, the preferred ionic compounds have a solubility in toluene at 22° C. of at least 0.1 weight percent, desirably, of at least 0.3 weight percent, more desirably of at least 1 weight percent, preferably of at least 5 weight percent, more preferably of at least 10 weight percent and in some instances even more than 15 weight percent.

The support of the present invention generally comprises from 0.001 to 10 mmol of activator compound per gram of inorganic oxide, preferably from 0.01 to 1 mmol/g. At too high amounts of activator compound, the support becomes expensive. At too low amounts the catalyst efficiency of the resulting supported catalyst becomes unacceptable. Residual hydroxyl content after reaction with the activator compound is desirably less than 50 mole percent based on desired transition metal complex loading, more preferably less than 10 mole percent based on desired transition metal complex loading, most preferably less than 1 mole percent based on desired transition metal complex loading.

The support of the present invention can be stored or shipped under inert conditions as such or slurried in an inert diluent, such as alkane or aromatic hydrocarbons. It may be used to generate the supported catalyst of the present invention by contacting with a suitable transition metal compound optionally in the presence of a liquid diluent.

Suitable metal complexes for use in combination with the foregoing cocatalysts include any complex of a metal of Groups 3-10 (preferably Group 4) of the Periodic table of the Elements capable of being activated to polymerize addition polymerizable compounds, especially olefins by the present activators. Examples include Group 10 diimine derivatives corresponding to the formula:

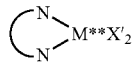

wherein

is

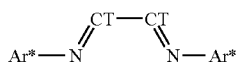

M* is Ni(II) or Pd(II);
X' is halo, hydrocarbyl, or hydrocarbyloxy;
Ar* is an aryl group, especially 2,6-diisopropylphenyl or aniline group; and
CT-CT is 1,2-ethanediyl, 2,3-butanediyl, or form a fused ring system wherein the two T groups together are a 1,8-naphthanediyl group.

Similar complexes to the foregoing are disclosed by M. Brookhart, et al., in J. Am. Chem. Soc., 118, pp. 267-268 (1996) and J. Am. Chem. Soc., 117, pp. 6414-6415 (1995), as being suitable for forming active polymerization catalysts especially for polymerization of x-olefins, either alone or in combination with polar comonomers such as vinyl chloride, alkyl acrylates and alkyl methacrylates.

Additional complexes include derivatives of Group 3, 4, or Lanthanide metals containing from 1 to 3 π-bonded anionic or neutral ligand groups, which may be cyclic or non-cyclic delocalized π-bonded anionic ligand groups. Exemplary of such π-bonded anionic ligand groups are conjugated or non-conjugated, cyclic or non-cyclic dienyl groups, allyl groups, boratabenzene groups, phosphoyl groups and arene groups. By the term "π-bonded" is meant that the ligand group is bonded to the transition metal by a sharing of electrons from a delocalized π-bond.

Each atom in the delocalized π-bonded group may independently be substituted with a hydrogen, halogen, hydrocarbyl, halohydrocarbyl, hydrocarbyloxy, hydrocarbylsulfide, dihydrocarbylamino, or hydrocarbyl-substituted metalloid radical, wherein the metalloid is selected from Group 14 of the Periodic Table of the Elements, or such hydrocarbyl-, halohydrocarbyl-, hydrocarbyloxy-, hydrocarbylsulfide-, dihydrocarbylamino- or hydrocarbyl-substituted metalloid-radicals that are further substituted with a Group 15 or 16 hetero atom containing moiety. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. In addition two or more such radicals may together form a fused ring system, including partially or fully hydrogenated fused ring systems, or they may form a metallocycle with the metal. Suitable hydrocarbyl-substituted organometalloid radicals include mono-, di- and tri-substituted organometalloid radicals of Group 14 elements wherein each of the hydrocarbyl groups contains from 1 to 20 carbon atoms. Examples of suitable hydrocarbyl-substituted organometalloid radicals include trimethylsilyl, triethylsilyl, ethyldimethylsilyl, methyldiethylsilyl, triphenylgermyl, and trimethylgermyl groups. Examples of Group 15 or 16 heteroatom-containing moieties include amine, phosphine, ether or thioether moieties or divalent derivatives thereof, for example amide, phosphide, ether or thioether groups bonded to the transition metal or Lanthanide metal, and bonded to the hydrocarbyl group or to the hydrocarbyl-substituted metalloid containing group.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzene groups, as well as $C_{1-10}$ hydrocarbyl-substituted, $C_{1-10}$ hydrocarbyloxy-substituted, di($C_{1-10}$ hydrocarbyl)amino-substituted, or tri($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclo-pentadienyl, indenyl, 2,3-dimethylindenyl, fluorenyl, 2-methylindenyl, 2-methyl-4-phenylindenyl, tetrahydrofluorenyl, octahydrofluorenyl, and tetrahydroindenyl.

The boratabenzenes are anionic ligands which are boron containing analogues to benzene. They are previously known in the art having been described by G. Herberich, et al., in Organometallics, 1995, 14, 1, pp. 471-480. Preferred boratabenzenes correspond to the formula:

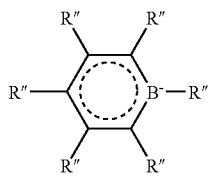

wherein R" is independently a hydrocarbyl, silyl, or germyl radical, said R" having up to 20 non-hydrogen atoms. In complexes involving divalent derivatives of such delocalized π-bonded groups, one atom thereof is bonded by means of a covalent bond or a covalently bonded divalent group to another atom of the complex thereby forming a bridged system.

Phospholes are anionic ligands that are phosphorus-containing analogues to a cyclopentadienyl group. They are previously known in the art having been described by WO 98/50392, and elsewhere. Preferred phosphole ligands correspond to the formula:

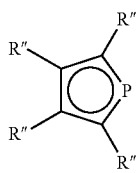

wherein R' is as previously defined.

Suitable metal complexes for use in the catalysts of the present invention may be derivatives of any transition metal including Lanthanides, but preferably of Group 3, 4, or Lanthanide metals which are in the +2, +3, or +4 formal oxidation state meeting the previously mentioned requirements. Preferred compounds include metal complexes (metallocenes) containing from 1 to 3 π-bonded anionic ligand groups, which may be cyclic or noncyclic delocalized π-bonded anionic ligand groups. Exemplary of such π-bonded anionic ligand groups are conjugated or nonconjugated, cyclic or non-cyclic dienyl groups, allyl groups, and arene groups. By the term "π-bonded" is meant that the ligand group is bonded to the transition metal by means of delocalized electrons present in a π-bond.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, as well as $C_{1-10}$ hydrocarbyl-substituted derivatives thereof. Preferred anionic delocalized π-bonded groups are cyclopentadienyl, pentamethylcyclopentadienyl, tetramethylcyclopentadienyl, indenyl, 2,3-dimethylindenyl, fluorenyl, 2-methylindenyl and 2-methyl-4-phenylindenyl.

More preferred are metal complexes corresponding to the formula:

$L*_lMX^\wedge_mX''_pX'''_q$, or a dimer thereof wherein:

L* is an anionic, delocalized, π-bonded group that is bound to M, containing up to 50 atoms not counting hydrogen, optionally two L groups may be joined together through one or more substituents thereby forming a bridged structure, and further optionally one L* may be bound to X through one or more substituents of L*;

M is a metal of Group 4 of the Periodic Table of the Elements in the +2, +3 or +4 formal oxidation state;

X^ is a divalent substituent of up to 50 non-hydrogen atoms that together with L* forms a metallocycle with M;

X" is a neutral Lewis base having up to 20 non-hydrogen atoms;

X'" is independently at each occurrence a monovalent, anionic moiety having up to 40 non-hydrogen atoms, optionally, two X' groups may be covalently bound together forming a divalent dianionic moiety having both valences bound to M, or form a neutral, conjugated or nonconjugated diene that is π-bonded to M (whereupon M is in the +2 oxidation state), or further optionally one or more X" and one or more X' groups may be bonded together thereby forming a moiety that is both covalently bound to M and coordinated thereto by means of Lewis base functionality;

l is 1 or 2;

m is 0 or 1;

p is a number from 0 to 3;

is an integer from 0 to 3; and the sum, l+m+q, is equal to the formal oxidation state of M.

Such preferred complexes include those containing either one or two L* groups. The latter complexes include those containing a bridging group linking the two L* groups. Preferred bridging groups are those corresponding to the formula $(E^\wedge R*_2)_x$ wherein $E^\wedge$ is silicon or carbon, R* independently each occurrence is hydrogen or a group selected from silyl, hydrocarbyl, hydrocarbyloxy and combinations thereof, said R* having up to 30 carbon or silicon atoms, and x is 1 to 8. Preferably, R* independently each occurrence is methyl, benzyl, tert-butyl or phenyl.

Preferred divalent X^ substituents preferably include groups containing up to 30 atoms not counting hydrogen and comprising at least one atom that is oxygen, sulfur, boron or a member of Group 14 of the Periodic Table of the Elements directly attached to the delocalized π-bonded group, and a different atom, which is nitrogen, phosphorus, oxygen or sulfur that is covalently bonded to M.

Examples of the foregoing bis(L*) containing complexes are compounds corresponding to the formula:

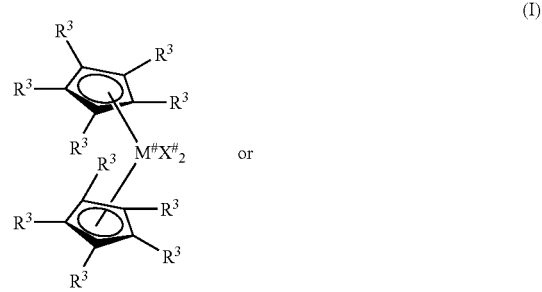

(I)

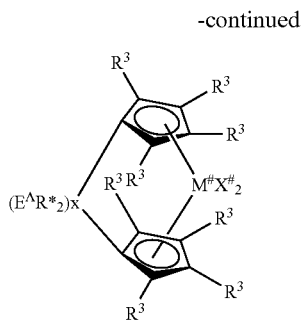

(II)

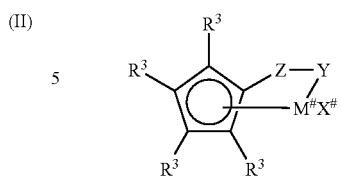

wherein:

$M^\#$ is titanium, zirconium or hafnium, preferably zirconium or hafnium, in the +2 or +4 formal oxidation state;

$R^3$ in each occurrence independently is hydrogen, hydrocarbyl, dihydrocarbylamino, hydrocarbyleneamino, silyl, germyl, cyano, halo or combinations thereof, said $R^3$ having up to 20 atoms not counting hydrogen, or adjacent $R^3$ groups together form a divalent derivative thereby forming a fused ring system, and $X^\#$ independently at each occurrence is an anionic ligand group of up to 40 atoms not counting hydrogen, or two $X^\#$ groups together form a divalent anionic ligand group of up to 40 atoms not counting hydrogen or together are a conjugated diene having from 4 to 30 atoms not counting hydrogen forming a π-complex with $M^\#$, whereupon $M^\#$ is in the +2 formal oxidation state, and $(E^{\wedge}R^*{}_2)_x$ is as defined above.

The foregoing metal complexes are especially suited for the preparation of polymers having stereoregular molecular structure. In such capacity it is preferred that the complex possess $C_2$ symmetry or possess a chiral, stereorigid structure. Examples of the first type are compounds possessing different delocalized π-bonded systems, such as one cyclopentadienyl group and one fluorenyl group. Similar systems based on Ti(IV) or Zr(IV) were disclosed for preparation of syndiotactic olefin polymers in Ewen, et al., *J. Am. Chem. Soc.*, 110, pp. 6255-6256 (1980). Examples of chiral structures include bis-indenyl complexes. Similar systems based on Ti(IV) or Zr(IV) were disclosed for preparation of isotactic olefin polymers in Wild et al., *J. Organomet. Chem*, 232, pp. 233-47, (1982).

Exemplary bridged ligands containing two π-bonded groups are: (dimethylsilyl-bis-cyclopentadienyl), (dimethylsilyl-bis-methylcyclopentadienyl), (dimethylsilyl-bis-ethylcyclopentadienyl), (dimethylsilyl-bis-t-butylcyclopentadienyl), (dimethylsilyl-bis-tetramethylcyclopentadienyl), (dimethylsilyl-bis-indenyl), (dimethylsilyl-bis-tetrahydroindenyl), (dimethylsilyl-bis-fluorenyl), (dimethylsilyl-bis-tetrahydrofluorenyl), (dimethylsilyl-bis-2-methyl-4-phenylindenyl), (dimethylsilyl-bis-2-methylindenyl), (dimethylsilyl-cyclopentadienyl-fluorenyl), (1,1,2,2-tetramethyl-1,2-disilyl-bis-cyclopentadienyl), (1,2-bis(cyclopentadienyl) ethane, and (isopropylidene-cyclopentadienyl-fluorenyl).

Preferred $X^\#$ groups are selected from hydride, hydrocarbyl, silyl, germyl, halohydrocarbyl, halosilyl, silylhydrocarbyl and aminohydrocarbyl groups, or two $X^\#$ groups together form a divalent derivative of a conjugated diene or else together they form a neutral, π-bonded, conjugated diene. Most preferred $X^\#$ groups are $C_{1-20}$ hydrocarbyl groups.

A preferred class of such Group 4 metal coordination complexes used according to the present invention correspond to the structure:

wherein:

$M^\#$, $X^\#$ and $R^3$ are as defined above,

Y is —O—, —S—, —NR*—, or —PR*—; and

Z is $SiR^*{}_2$, $CR^*{}_2$, $SiR^*{}_2SiR^*{}_2$, $CR^*{}_2CR^*{}_2$, $CR^*{=}CR^*$, $CR^*{}_2SiR^*{}_2$, $BNR^*{}_2$, or $GeR^*{}_2$, wherein $R^*$ is as defined above.

Illustrative Group 4 metal complexes that may be employed in the practice of the present invention include: cyclopentadienyltitaniumtrimethyl,
cyclopentadienyltitaniumtriethyl,
cyclopentadienyltitaniumtriisopropyl,
cyclopentadienyltitaniumtriphenyl,
cyclopentadienyltitaniumdibenzyl,
cyclopentadienyltitanium-2,4-pentadienyl,
cyclopentadienyltitaniumdimethylmethoxide,
cyclopentadienyltitaniumdimethylchloride,
pentamethylcyclopentadienyltitaniumtrimethyl,
indenyltitaniumtrimethyl,
indenyltitaniumtriethyl,
indenyltitaniumtripropyl,
indenyltitaniumtriphenyl,
tetrahydroindenyltitaniumtribenzyl,
pentamethylcyclopentadienyltitaniumtriisopropyl,
pentamethylcyclopentadienyltitaniumtribenzyl,
pentamethylcyclopentadienyltitaniumdimethylmethoxide,
($\eta^5$-2,4-dimethyl-1,3-pentadienyl)titaniumtrimethyl,
octahydrofluorenyltitaniumtrimethyl,
tetrahydroindenyltitaniumtrimethyl,
tetrahydrofluorenyltitaniumtrimethyl,
(1,1-dimethyl-2,3,4,9,10-(-1,4,5,6,7,8-hexahydronaphthalenyl)titaniumtrimethyl,
(1,1,2,3-tetramethyl-2,3,4,9,10-(-1,4,5,6,7,8-hexahydronaphthalenyl)titaniumtrimethyl,
(tert-butylamido)(tetramethyl-$\eta^5$-cyclopentadienyl)dimethylsilanetitanium dimethyl,
(tert-butylamido)(tetramethyl-$\eta^5$-cyclopentadienyl)-1,2-ethanediyltitanium dimethyl,
(tert-butylamido)(hexamethyl-$\eta^5$-indenyl)dimethylsilanetitanium dimethyl,
(tert-butylamido)(tetramethyl-$\eta^5$-cyclopentadienyl)dimethylsilane titanium (III) 2-(dimethylamino)benzyl;
(tert-butylamido)(tetramethyl-$\eta^5$-cyclopentadienyl)dimethylsilanetitanium (II) allyl,
(tert-butylamido)(tetramethyl-$\eta^5$-cyclopentadienyl)dimethylsilanetitanium (II) 1,4-diphenyl-1,3-butadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (IV) 1,3-butadiene,
(tert-butylamido)(2,3-dimethylindenyl)dimethylsilanetitanium (II) 1,4-diphenyl-1,3-butadiene,
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2-methylindenyl)dimethylsilanetitanium (II) 1,3-pentadiene, (tert-butylamido)(2-methylindenyl)dimethylsilanetitanium (IV) dimethyl,
(tert-butylamido)(2-methyl-4-phenylindenyl)dimethylsilanetitanium (II) 1,4-diphenyl-1,3-butadiene,
(tert-butylamido)(tetramethyl-$\eta^5$-cyclopentadienyl)dimethylsilanetitanium (IV) 1,3-butadiene,
(tert-butylamido)(tetramethyl-$\eta^5$-cyclopentadienyl)dimethylsilanetitanium (II) 1,4-dibenzyl-1,3-butadiene,
(tert-butylamido)(tetramethyl-$\eta^5$-cyclopentadienyl)dimethylsilanetitanium (II) 2,4-hexadiene,
(tert-butylamido)(tetramethyl-$\eta^5$-cyclopentadienyl)dimethylsilanetitanium (II) 3-methyl 1,3-pentadiene,
(tert-butylamido)(2,4-dimethyl-1,3-pentadien-2-yl)dimethylsilanetitaniumdimethyl,
(tert-butylamido)(1,1-dimethyl-2,3,4,9,10-(-1,4,5,6,7,8-hexahydronaphthalen-4-yl)dimethylsilanetitaniumdimethyl,
(tert-butylamido)(1,1,2,3-tetramethyl-2,3,4,9,10-(-1,4,5,6,7,8-hexahydronaphthalen-4-yl)dimethylsilanetitaniumdimethyl,
(tert-butylamido)(tetramethylcyclopentadienyl)dimethylsilanetitanium 1,3-pentadiene,
(tert-butylamido)(3-(N-pyrrolidinyl)inden-1-yl)dimethylsilanetitanium 1,3-pentadiene,
(tert-butylamido)(2-methyl-s-indacen-1-yl)dimethylsilanetitanium 1,3-pentadiene, and
(tert-butylamido)(3,4-cyclopenta(phenanthren-2-yl)dimethylsilanetitanium 1,4-diphenyl-1,3-butadiene.

Bis(L*)-containing complexes including bridged complexes suitable for use in the present invention include:
biscyclopentadienylzirconiumdimethyl,
biscyclopentadienylzirconiumdiethyl,
biscyclopentadienylzirconiumdiisopropyl,
biscyclopentadienylzirconiumdiphenyl,
biscyclopentadienylzirconium dibenzyl,
biscyclopentadienylzirconium-2,4-pentadienyl,
biscyclopentadienylzirconiummethylmethoxide,
bispentamethylcyclopentadienylzirconiumdimethyl,
bisindenylzirconiumdimethyl,
indenylfluorenylzirconiumdiethyl,
bisindenylzirconiummethyl(2-(dimethylamino)benzyl),
bisindenylzirconium methyltrimethylsilyl,
bistetrahydroindenylzirconium methyltrimethylsilyl,
bispentamethylcyclopentadienylzirconiumdiisopropyl,
bispentamethylcyclopentadienylzirconiumdibenzyl
bispentamethylcyclopentadienylzirconiummethylmethoxide,
(dimethylsilyl-bis-cyclopentadienyl)zirconiumdimethyl,
(dimethylsilyl-bis-pentamethylcyclopentadienyl)zirconium-2,4-pentadienyl,
(methylene-bis-pentamethylcyclopentadienyl)zirconium (III) 2-(dimethylamino)benzyl,
(dimethylsilyl-bis-2-methylindenyl)zirconiumdimethyl,
(dimethylsilyl-bis-2-methyl-4-phenylindenyl)zirconiumdimethyl,
(dimethylsilyl-bis-2-methylindenyl)zirconium-1,4-diphenyl-1,3-butadiene,
(dimethylsilyl-bis-2-methyl-4-phenylindenyl)zirconium (II) 1,4-diphenyl-1,3-butadiene,
(dimethylsilyl-bis-tetrahydroindenyl)zirconium(II) 1,4-diphenyl-1,3-butadiene,
(dimethylsilyl-bis-tetrahydrofluorenyl)zirconiumdi(trimethylsilyl),
(isopropylidene)(cyclopentadienyl)(fluorenyl)zirconiumdibenzyl, and
dimethylsilylpentamethylcyclopentadienylfluorenyl)zirconiumdimethyl.

Other compounds which are useful in the preparation of catalyst compositions according to this invention, especially compounds containing other Group 4 metals, will, of course, be apparent to those skilled in the art.

Generally, the ratio of moles of activator compound (B) to moles of transition metal compound (C) in the supported catalyst is from 0.5:1 to 2:1, preferably from 0.5:1 to 1.5:1 and most preferably from 0.75:1 to 1.25:1. At too low ratios the supported catalyst will not be very active, whereas at too high ratios the catalyst cost becomes excessive due to the relatively large quantities of activator compound utilized. The quantity of transition metal complex chemically bound to the inorganic oxide matrix in the resulting supported catalyst is preferably from 0.0005 to 20 mmol/g, more preferably from 0.001 to 10 mmol/g.

The supported catalyst of the present invention can be prepared by combining the support material, the activator compound and the metal complex in any order. Preferably, the inorganic oxide material is first treated with the activator compound by combining the two components in a suitable liquid diluent, such as an aliphatic or aromatic hydrocarbon to form a slurry. The temperature, pressure, and contact time for this treatment are not critical, but generally vary from −20° C. to 150° C., from 1 Pa to 10,000 MPa, more preferably at atmospheric pressure (100 kPa), for 5 minutes to 48 hours. Usually the slurry is agitated. After this treatment the solids are typically separated from the diluent.

Before using the support of the invention, the diluent or solvent is preferably removed to obtain a free flowing powder. This is preferably done by applying a technique which only removes the liquid and leaves the resulting solid, such as by applying heat, reduced pressure, evaporation, or a combination thereof. Alternatively, the support may be further contacted with the transition metal compound prior to removing the liquid diluent. If so contacted the transition metal compound is preferably used dissolved in a suitable solvent, such as a liquid hydrocarbon solvent, advantageously a $C_{5-10}$ aliphatic or cycloaliphatic hydrocarbon or a $C_{6-10}$ aromatic hydrocarbon. Alternatively, a suspension or dispersion of the transition metal compound in a liquid medium in which the transition metal is either insoluble or sparingly soluble may also be used. The contact temperature is not critical provided it is below the decomposition temperature of the transition metal and of the activator. Good results are obtained in a temperature range of 0 to 100° C. The contact may be total immersion in the liquid medium or contact with an atomized spray of the solution, dispersion or suspension. All steps in the present process should be conducted in the absence of oxygen and moisture. The resulting supported catalyst may be stored or shipped in free flowing form under inert conditions after removal of the solvent.

The process of the invention includes three primary preferred embodiments. In one preferred embodiment, the hydroxyl groups are non-functionalized prior to contacting with the cation/anion pair, and wherein the cation contains a ligand having an $SiX^p_3$ group capable of reacting with a hydroxyl group, with each $X^p$ is independently an alkyl, aryl, hydride, halide, or alkyoxide radical, with the proviso that at least one $X^p$ is a hydride, halide, or alkoxide radical. In another preferred embodiment, the hydroxyl groups are functionalized with a functionalizing agent prior to contacting with the cation/anion pair, the cation contains a reactive hydroxyl, thiol, or amine group, and the functionalizing agent in turn comprises a silane containing a ligand capable of reacting with the hydroxyl, thiol, or amine group of the cation to form a chemical bond. In yet another preferred embodiment, the hydroxyl groups are functionalized with a functionalizing agent prior to contacting with the cation/anion pair, the cation contains a reactive hydroxyl, thiol, or amine group, and the functionalizing agent in turn comprises a compound corresponding to the formula $R^p{}_3Al$ or an alumoxane, with RP being a $C_1$-$C_{20}$ alkyl radical.

The supported catalysts of the present invention may be used in addition polymerization processes wherein one or more addition polymerizable monomers are contacted with the supported catalyst of the invention under addition polymerization conditions.

Suitable addition polymerizable monomers include ethylenically unsaturated monomers, acetylenic compounds, conjugated or non-conjugated dienes, and polyenes. Preferred monomers include olefins, for examples alpha-olefins having from 2 to 20,000, preferably from 2 to 20, more preferably from 2 to 8 carbon atoms and combinations of two or more of such alpha-olefins. Particularly suitable alpha-olefins include, for example, ethylene, propylene, 1-butene, 1-pentene, 4-methylpentene-1,1-hexene, 1-heptene, 1-octene, 1-nonene, 1-decene, 1-undecene, 1-dodecene, 1-tridecene, 1-tetradecene, 1-pentadecene, or combinations thereof, as well as long chain vinyl terminated oligomeric or polymeric reaction products formed during the polymerization, and $C_{10-30}$ α-olefins specifically added to the reaction mixture in order to produce relatively long chain branches in the resulting polymers. Preferably, the alpha-olefins are ethylene, propene, 1-butene, 4-methyl-pentene-1,1-hexene, 1-octene, and combinations of ethylene and/or propene with one or more of such other alpha-olefins. Other preferred monomers include styrene, halo- or alkyl substituted styrenes, tetrafluoroethylene, vinylcyclobutene, 1,4-hexadiene, dicyclopentadiene, ethylidene norbornene, and 1,7-octadiene. Mixtures of the above-mentioned monomers may also be employed.

The supported catalyst can be advantageously employed in a high pressure, solution, slurry or gas phase polymerization process. A high pressure process is usually carried out at temperatures from 100 to 400° C. and at pressures above 500 bar. A slurry process typically uses an inert hydrocarbon diluent and temperatures of from 0° C. up to a temperature just below the temperature at which the resulting polymer becomes substantially soluble in the inert polymerization medium. Preferred temperatures are from 40° C. to 115° C. The solution process is carried out at temperatures from the temperature at which the resulting polymer is soluble in an inert solvent up to 275° C., preferably at temperatures of from 130° C. to 260° C., more preferably from 150° C. to 240° C. Preferred inert solvents are $C_{1-20}$ hydrocarbons and preferably $C_{5-10}$ aliphatic hydrocarbons, including mixtures thereof. The solution and slurry processes are usually carried out at pressures between 100 kPa to 10 MPa. Typical operating conditions for gas phase polymerizations are from 20 to 100° C., more preferably from 40 to 80° C. In gas phase processes the pressure is typically from 10 kPa to 10 MPa. Condensed monomer or diluent may be present during the polymerization, such as by injecting the same into the reactor to assist in heat removal by means of latent heat of vaporization.

Preferably for use in gas phase polymerization processes, the support has a median particle diameter from 20 to 200 μm, more preferably from 30 μm to 150 μm, and most preferably from 50 μm to 100 μm. Preferably for use in slurry polymerization processes, the support has a median particle diameter from 1 to 200 μm, more preferably from 5 μm to 100 μm, and most preferably from 20 μm to 80 μm. Preferably for use in solution or high pressure polymerization processes, the support has a median particle diameter from 1 to 40 μm, more preferably from 1 μm to 30 μm, and most preferably from 1 μm to 20 μm.

In the polymerization process of the present invention, scavengers may be used which serve to protect the supported catalyst from catalyst poisons such as water, oxygen, and polar compounds. These scavengers are generally used in varying amounts depending on the amounts of impurities. Preferred scavengers include the aforementioned organoaluminum compounds of the formula $AlR_3$ or alumoxanes.

In the present polymerization process, molecular weight control agents can also be used. Examples of such molecular weight control agents include hydrogen, trialkyl aluminum compounds or other known chain transfer agents. A particular benefit of the use of the present supported catalysts is the ability (depending on reaction conditions) to produce narrow molecular weight distribution α-olefin homopolymers and copolymers. Preferred polymers have Mw/Mn of less than 2.5, more preferably less than 2.3. Such narrow molecular weight distribution polymer products, especially those from a slurry process are highly desirable due to improved tensile strength properties.

Having described the invention the following examples are provided as further illustration thereof and are not to be construed as limiting. Unless stated to the contrary all parts and percentages are expressed on a weight basis. The bulk density of the polymers produced was determined according to ASTM 1895. Unless otherwise stated, all manipulations were carried out in an inert atmosphere either in a nitrogen-filled glove box or under nitrogen using Schlenk techniques.

EXAMPLE 1

A. Preparation of 3-hydroxy-N,N-dimethylanilinium chloride 3-dimethylaminophenol, 10.2 g, was slurried in 75 mL of anhydrous diethyl ether and 82 mL of a 1 M HCl solution in ether was added by canula under positive nitrogen pressure. After two hours the white solid precipitate was collected on a fritted funnel, washed with ether and dried in vacuo.

B. Preparation of 3-hydroxy-N,N-dimethylanilinium tetrakis(pentafluorophenyl)borate In air, 2.00 g (11.5 mmol) of 3-hydroxy-N,N-dimethylanilinium chloride, 10.2 g of $Li[B(C_6F_5)_4](LiCl)_x(Et_2O)_y$ (11.5 mmol), 100 mL $CH_2Cl_2$ and 80 mL of water were shaken together for 30 minutes. The $CH_2Cl_2$ layer was isolated, washed twice with distilled water and dried over anhydrous magnesium sulfate. The dry solution was filtered and the solvent removed under reduced pressure to yield a violet oil. Trituration with pentane followed by solvent evaporation in vacuo yielded a pale violet, crystalline solid. Isolated yield: 7.25 g, 77.2%.

C. Preparation of Supported Cocatalyst

A 0.00106 M solution of the 3-hydroxy-N,N-dimethylanilinium tetrakis(pentafluorophenyl)borate was prepared by dissolving 0.865 g of the borate in 100 ml of toluene. To a toluene slurry of 5.0 g triethyl aluminum treated silica (containing nominally 2.3% Al) was added 7.1 mL of the borate solution (75 (mol, 15 (mol/g). The color quickly transferred to the silica. After five minutes the solid was collected on a fritted funnel, washed twice with 10 mL portions of toluene and once with 20 mL of toluene and then dried in vacuo.

D. Preparation of Polymerization Catalyst

The supported cocatalyst (C) was slurried in 20 mL of hexane and 0.394 mL of a 0.191 M solution of (t-butylamido) dimethyl(tetramethyl-($^5$-cyclopentadienyl)-silane titanium 1-3 pentadiene was added. The pale green solid resulting was collected on a fritted funnel, washed with several portions of hexane and dried in vacuo.

E. Formation of Ethylene-Hexene Copolymer

A 5 L fixed bed reactor was charged with 300 g NaCl, heated to 70° C., and pressurized to 8 bar with ethylene. Hexene-1 was introduced as a liquid to a level of 5000 ppm. 0.020 g of the catalyst D was introduced and the polymerization was carried out with ethylene feed on demand, maintaining a hexene concentration of 5000 ppm. The reaction produced 36.5 g of ethylene-hexene copolymer in 92 minutes, corresponding to an average activity of 127 gPE/gTiHrBar.

The invention claimed is:

1. A chemically-modified support consisting essentially of an inorganic oxide containing hydroxyl groups that are optionally functionalized and a cation/anion pair that is chemically bonded thereto through the cation of the cation/anion pair, wherein the cation contains at least one reactive moiety that forms a chemical bond with the hydroxyl groups of the inorganic oxide of the support.

2. A chemically-modified support consisting essentially of a reaction product of:
   (A) an inorganic oxide material containing hydroxyl groups that are optionally functionalized, and
   (B) a cation/anion pair comprising:
       $b_1$) a cation which is capable of reacting with a transition metal compound in conjunction with other components to form a catalytically active transition metal complex, and containing at least one reactive moiety able to react with the optionally functionalized hydroxyl groups of the inorganic oxide material, thereby chemically bonding the cation/anion pair to the surface of the support through the cation of the pair; and
       $b_2$) a compatible non-coordinating anion.

3. A chemically-modified support consisting essentially of a reaction product of an inorganic oxide material containing hydroxyl groups that are optionally functionalized, and a cation/anion pair, wherein the cation of the pair corresponds to the formula:

$(R^\#_n AD)^+$ wherein A=N, P, O, S, C, or Si,
   $R^\#$=hydrogen, alkyl, aryl, alkoxide, halide or similar substituent which may be the same or different or in which two groups are linked to form a ring and containing from 1 to 20 carbon atoms,
   n is 3 when A=is N or P and at least one $R^\#$=H,
   n is 2 when A=O, S, C or Si, and, when A is O or S, at least one $R^\#$=H, and
   D=hydroxyalkyl, hydroxyaryl, thioalkyl, thioaryl, hydrosilylalkyl, mono-, di-, or tris-alkoxysilyl, -alkoxysilylalkyl, and -alkoxysilylaryl, said hydrocarbyl radicals having from 4 to 20 nonhydrogen atoms,
   wherein a chemical bond is formed between the optionally functionalized hydroxyl groups of the inorganic oxide material and group D of the cation.

4. The chemically-modified support of any one of claims 1-3, wherein at least a portion of the hydroxyl groups have been functionalized by means of a functionalizing agent, to yield a level of non-functionalized hydroxyl groups of from 0.0001-10 mmol/g of the inorganic oxide material, as determined by Fourier Transform Infrared Spectroscopy.

5. The chemically-modified support of any one of claims 1-3, wherein the anion of the pair corresponds to the formula:

$[M^*Q_4]^-$;

wherein:
M* is boron or aluminum in the +3 formal oxidation state; and
Q independently at each occurrence is selected from the group consisting of hydride, dialkylamido, halide, hydrocarbyl, halohydrocarbyl, halocarbyl, hydrocarbyloxide, hydrocarbyloxy substituted-hydrocarbyl, organometal substituted-hydrocarbyl, organometalloid substituted-hydrocarbyl, halohydrocarbyloxy, halohydrocarbyloxy substituted hydrocarbyl, halocarbyl-substituted hydrocarbyl, and halo-substituted silylhydrocarbyl radicals, said Q having up to 20 nonhydrogen atoms with the proviso that in not more than one occurrence is Q a halide radical.

6. The chemically-modified support of any one of claims 1-3, wherein the anion of the pair is a compound corresponding to the formula:

$(EJ_j)^{-c}{}_d$, wherein:
E is an anion group of from 1 to 30 atoms, not counting hydrogen atoms, further containing two or more Lewis base sites,
J independently each occurrence is a Lewis acid coordinated to at least one Lewis base site of E, and optionally two of more such J groups may be joined together in a moiety having multiple Lewis acidic functionality,
j is a number from 2 to 12, and
c and d are integers from 1 to 3, with the proviso that the charge associated with the anion is balanced by the charge associated with the cation(s) to give a neutral ionic compound.

7. The chemically-modified support of claim 1 or 2, wherein the cation of the pair is selected from the group consisting of Bronsted acidic cations, carbonium cations, and silylium cations.

8. The chemically-modified support of any one of claims 1-3, wherein the cation of the pair is:

$[Me_2NH(C_6H_4OH)]^+$ $[HNMe(C_{18}H_{37})(C_6H_4OH)]^+$ $[HNMe(C_{11}H_{23})(C_6H_4OH)]^+$ $[(C_6H_5)_2PH(C_6H_4OH)]^+$ $[(C_6H_5)_2C(C_6H_4OH)]^+$ $[(C_6H_5)OH(C_6H_4OH)]^+$ $[(C_6H_5)SH(C_6H_4OH)]^+$ $[Et_2SiCH_2CH_2OH)]^+$ $[Me_2NH(C_6H_4SH)]^+$ $[(C_6H_5)_2PH(C_6H_4SH)]^+$ $[(C_6H_5)_2C(C_6H_4SH)]^+$ $[(C_6H_5)OH(C_6H_4SH)]^+$

[(C₆H₅)SH(C₆H₄SH)]⁺

[(C₆H₅)SH(C₆H₄SH)]⁺

[(C₆H₅)₂PH(C₆H₄SiH₃)]⁺

[(C₆H₅)₂C(C₆H₄SiH₃)]⁺

[(C₆H₅)OH(C₆H₄SiH₃)]⁺

[(C₆H₅)SH(C₆H₄SiH₃)]⁺

[Me₂NH(C₆H₄Si(OMe)₃)]⁺

[(C₆H₅)₂PH(C₆H₄Si(OMe)₃)]⁺

[(C₆H₅)₂C(C₆H₄Si(OMe)₃)]⁺

[(C₆H₅)OH(C₆H₄Si(OMe)₃)]⁺ or

[(C₆H₅)SH(C₆H₄Si(OMe)₃)]⁺.

9. The chemically-treated support of any one of claims 1-3, wherein the cation of the pair is selected from the group consisting of [Me₂NH(C₆H₄OH)]⁺, [HNMe(C₁₈H₃₇)(C₆H₄OH)]⁺, and [HNMe(C₁₁H₂₃)(C₆H₄OH)]⁺.

10. A supported catalyst system comprising the chemically-modified support of any one of claims 1-3, and a transition metal compound of Groups 3-10 containing at least one π-bonded anionic ligand group, said transition metal compound being capable of reacting with the chemically-modified support through the cation of the cation/anion pair to thereby render the transition metal compound catalytically active.

11. The supported catalyst system of claim 10, wherein each π-bonded anionic ligand group is independently selected from the group consisting of cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, and decahydroanthracenyl groups, and C₁₋₁₀ hydrocarbyl-substituted derivatives thereof.

12. A process for preparing a chemically-modified support consisting essentially of combining an inorganic oxide material containing hydroxyl groups that are optionally functionalized with a cation/anion pair, wherein the cation of the pair corresponds to the formula:

(R#ₙAD)⁺ wherein A=N, P, O, S, C, or Si,

R#=hydrogen, alkyl, aryl, alkoxide, halide or similar substituent which may be the same or different or in which two groups are linked to form a ring and containing from 1 to 20 carbon atoms, n is 3 when A=is N or P and at least one R#=H, n is 2 when A=O, S, C or Si, and, when A is O or S, at least one R#=H, and D=hydroxyalkyl, hydroxyaryl, thioalkyl, thioaryl, hydrosilylalkyl, mono-, di-, or tris-alkoxysilyl, -alkoxysilylalkyl, and -alkoxysilylaryl, said hydrocarbyl radicals having from 4 to 20 nonhydrogen atoms, wherein a chemical bond is formed between the optionally functionalized hydroxyl groups of the inorganic oxide material and Group D of the cation.

13. The process of claim 12, wherein the hydroxyl groups are non-functionalized prior to contacting with the cation/anion pair, and wherein the cation contains a ligand having an SiX^p₃ group capable of reacting with a hydroxyl group, with X^p independently being an alkyl, aryl, hydride, halide, or alkyoxide radical, with the proviso that at least one X^p is a hydride, halide, or alkoxide radical.

14. The process of claim 12, wherein the hydroxyl groups are functionalized with a functionalizing agent prior to contacting with the cation/anion pair, the cation contains a reactive hydroxyl, thiol, or amine group, and the functionalizing agent in turn comprises: (a) a silane containing a ligand capable of reacting with the hydroxyl, thiol, or amine group of the cation to form a chemical bond, (b) a compound corresponding to the formula R^p₃Al, with R^p being a C₁-C₂₀ alkyl radical, or (c) an alumoxane.

\* \* \* \* \*